United States Patent [19]

Wögerbauer

[11] Patent Number: 5,212,539
[45] Date of Patent: May 18, 1993

[54] APPARATUS FOR DETERMINING AT LEAST ONE SIZE PARAMETER OF AN OBJECT WHETHER IT IS MOVING OR AT REST

[75] Inventor: Johann-Peter Wögerbauer, Linz, Austria

[73] Assignee: Sprecher Energie Österreich GmbH, Linz, Austria

[21] Appl. No.: 804,219

[22] Filed: Dec. 6, 1991

[30] Foreign Application Priority Data

Dec. 10, 1990 [AT] Austria .................................. 2497/90

[51] Int. Cl.⁵ .............................................. G01B 11/08
[52] U.S. Cl. .................... 356/379; 356/384; 356/385
[58] Field of Search ............... 356/379, 380, 384, 385, 356/386, 387; 250/560

[56] References Cited

U.S. PATENT DOCUMENTS

| | | | |
|---|---|---|---|
| 3,513,321 | 5/1970 | Sherman | 356/386 |
| 3,819,918 | 6/1974 | Hale | 356/380 |
| 4,417,817 | 11/1983 | Böhme et al. | 356/380 |
| 4,773,029 | 9/1988 | Claesson et al. | 356/380 |

FOREIGN PATENT DOCUMENTS

| | | |
|---|---|---|
| 351282 | 12/1978 | Austria . |
| 2019290 | 4/1970 | Fed. Rep. of Germany . |
| 2127751 | 6/1971 | Fed. Rep. of Germany . |
| 3634065 | 4/1987 | Fed. Rep. of Germany ...... 356/379 |

Primary Examiner—F. L. Evans
Attorney, Agent, or Firm—Collard & Roe

[57] ABSTRACT

An apparatus for determining at least one size parameter of an object whether it is moving or at rest comprises an optoelectronic measuring system, which comprises an evaluating unit and transmitting and receiving means, which are disposed in a measuring plane that extends substantially at right angles to the longitudinal axis of the object. The measuring plane extends in a measuring portal, which comprises at least two measuring beams, which include a predetermined angle with each other. Each of said measuring beams has a side face which faces said measuring plane and on said side face is provided with at least one row of receiving elements. Associated with each of said rows of receiving elements is a transmitting element, which is disposed in the measuring plane at a fixed distance from the associated measuring beam and is adapted to be periodically activated to emit a fanlike light beam, which is incident on the receiving elements of the associated row thereof.

10 Claims, 2 Drawing Sheets

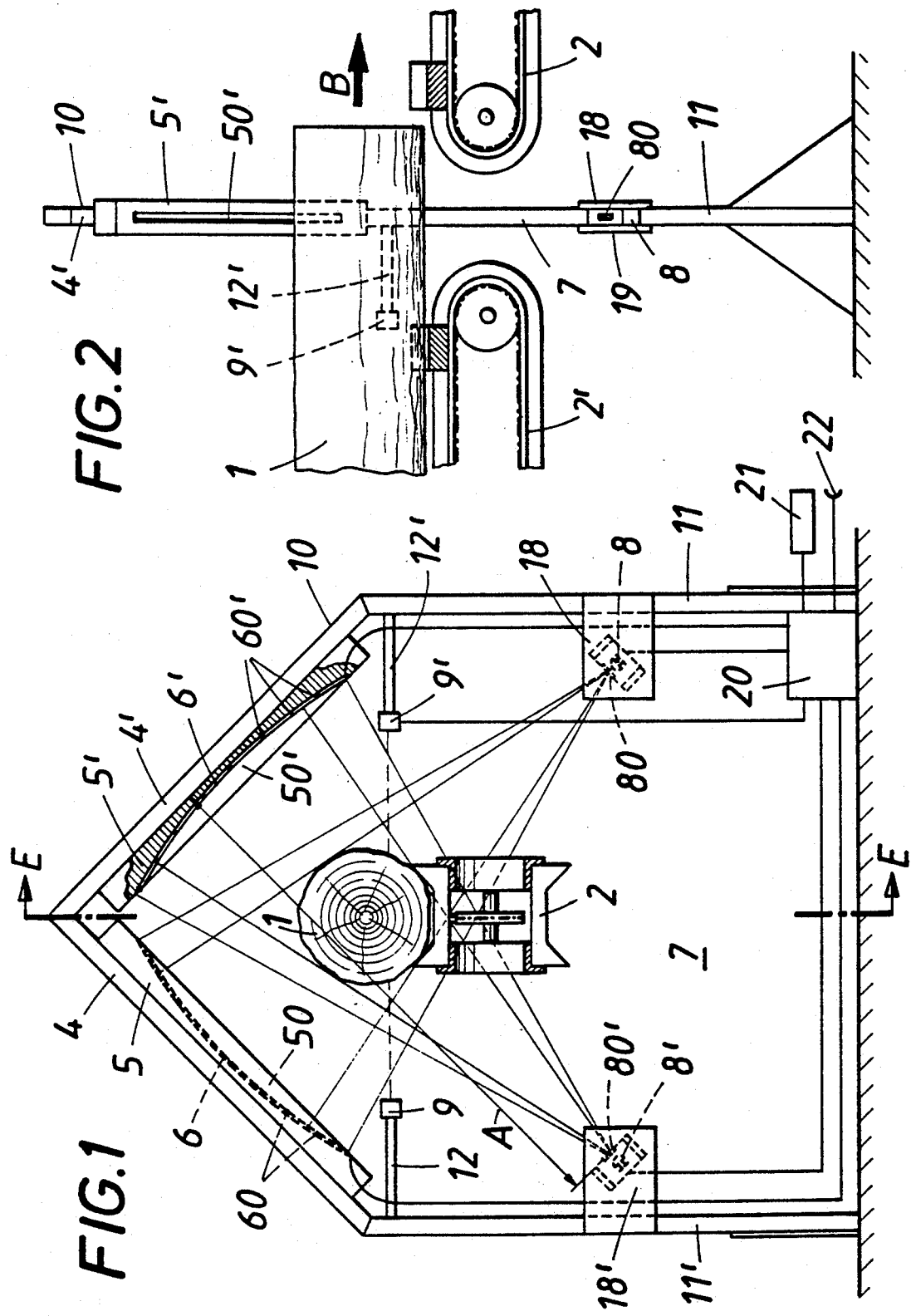

APPARATUS FOR DETERMINING AT LEAST ONE SIZE PARAMETER OF AN OBJECT WHETHER IT IS MOVING OR AT REST

BACKGROUND OF THE INVENTION

1. Field of the Invention

This invention relates to an apparatus for determining at least one size parameter of an object whether it is moving or at rest, which apparatus comprises an optoelectronic measuring system, which includes light transmitting and receiving elements disposed in at least one measuring plane that is substantially at right angles to the longitudinal axis of the object, and also includes an evaluating unit, wherein the measuring plane is defined by a measuring portal comprising at least two support beams for the light receiving elements of the measuring system, which include a predetermined angle with each other.

2. Background of the Invention

Austrian Patent Specification 351,282 discloses an apparatus for determining and/or monitoring at least one size parameter of an object whether it is moving or at rest, which apparatus comprises line cameras disposed in two planes, which include an angle of 90°, which cameras instead of a film comprise a surface provided with rows of photodiodes for generating an electronic image of the shadow of an object which is disposed in front of a bright background and viewed through an optical system.

That apparatus is rather expensive owing to the provision of the line cameras and has the disadvantage that in dependence on the position of the object being viewed the image of its shadow may be unsharp so that the accuracy of the measurement may adversely be affected.

German Patent Publication 2,019,290 and Published German Application 2,127,751 disclose apparatuses in which the object to be measured is periodically scanned so that an overall image of such object can never be generated at any specific instant. Those apparatuses have also the disadvantage that they require light transmitters or mirrors which are mechanically moved.

Other known apparatuses comprise support beams, in each of which a row of infrared-emitting diodes are closely and regularly spaced apart in a row and an infrared photodiode is associated with each of said rows and is disposed in the measuring plane and centered with respect to the support beam. The infrared-emitting diodes are consecutively activated together with the associated infrared photo-diode after short, equal intervals of time by an evaluating unit.

That apparatus for a periodic scanning has the disadvantage that the adjustment of the infrared-emitting diodes takes a long time and can be effected only with expensive means, such as an oscillograph. Besides, the signals generated by the infrared photo-diodes are relatively weak and must be amplified before they can be processed further. But such amplification may result in a drifting or change or the parameter as a function of time and temperature so that the result of the measurement may be distorted.

SUMMARY OF THE INVENTION

It is an object of the invention to provide an apparatus which is of the kind described first hereinbefore and by which the disadvantages set forth hereinbefore can be avoided and which permits an economical and exact measurement of the dimensions of an object, whether it is moving or at rest, with high reliability and with an accuracy which permits a calibration.

This is accomplished by arranging a plurality of receiving elements in a row on each support beam on that side face thereof which faces the measuring plane, and a single transmitting element is associated with each of said rows and is disposed in the measuring plane at a fixed distance from the associated support beam and is adapted to be periodically activated to emit a fanlike light beam, which is incident on the associated receiving elements.

Owing to the geometry of the apparatus at least one size parameter of the object is exactly determined by a strictly optoelectronic method. As an overall image of the object to be measured is generated at any time, the accuracy of the measurement is high and the size parameter or parameters are continuously determined. For adjusting the apparatus it is virtually sufficient to align the two fanlike light beams.

According to a preferred feature the row of receiving elements extends approximately along an arc of a circle which is centered on the associated transmitting element. Such an arrangement will increase the reliability and the insensitivity to extraneous light because the receiving elements will deliver signals of equal intensity for the electronic further processing.

The apparatus will permit a particularly simple adjustment and will have a particularly high serviceability if each of the transmitting elements consists of a laser diode unit comprising a laser diode, a three-lens collimator, fanning optical means, and a multiflexible electronic driver.

If the laser diode emits a visible fanlike laser beam at a wavelength of about 670 nm, the transmitting elements can be visually aligned in a very simple manner without a need for additional measuring instruments.

The receiving elements preferably consist of phototransistors and are accommodated in watertight receiving beams, which are formed with a glass-covered longitudinal slot, which extends continuously throughout the range on which the fanlike light beam is incident.

As phototransistors have a large angle of view, focussing is not required and machines for inserting components on printed circuit boards (SMD) can be used. The protected accommodation in the receiving beams will prevent external influences and an interference of extraneous light.

An apparatus which is particularly economical and serviceable will be obtained if the receiving elements of each row are subdivided into equal groups and the receiving elements of each group are mounted on one of a plurality of identical printed-circuit boards.

The modular design of the rows of receiving elements will minimize the wiring expenditure and will also facilitate the replacement of groups comprising worn-out receiving elements.

Each transmitting element is preferably accommodated in a watertight housing, which is formed with a glass-covered slot on the side which faces the associated receiving beam, and such housing is mounted on two rectangular plates, which laterally protrude from the housing and are fixed to respective columns, of the measuring portal. In that case the transmitting elements will also be protected from external influences and damage and can be mounted and replaced in an extremely simple manner.

To further facilitate the adjustment of the apparatus, the two transmitting elements may be adapted to be activated for a continuous emission of light for the adjustment of the receiving beams.

The evaluating unit preferably comprises a microprocessor system having a memory unit and operable to activate the transmitting and receiving elements in synchronism at a cycle frequency of more than 300 Hz.

Whereas the evaluating unit can simply be assembled from commercially integrated circuits which are commercially available, microprocessors may be available at lower cost and may be more easily adaptable. The selected cycle frequency will ensure a virtually continuous determination of size parameters throughout the length of the object to be measured even if such object is moved along its longitudinal axis at a velocity of more than 180 meters per minute.

According to a further feature the evaluating unit may be designed to determine and indicate the diameter and/or the volume of the object in dependence on the counted signals from both receiving elements, the determined number of receiving elements which are shielded by the object, the constant length of each row of receiving elements, the constant distance from each row of receiving element to the associated transmitting element and the constant distance between the two transmitting elements, and to generate a position signal in consideration of the distance from the object to the transmitting elements. By means of a stored algorithm the evaluating unit may mathematically calculate from said data a size parameter, for instance, the diameter of a treetrunk, with high accuracy. The law of sines is preferably employed in the algorithm.

According to a further feature the evaluating unit may be designed to simulate an illumination receiving elements which are shielded by protruding parts of the object. That suppression may be effected, e.g., by programmed logic circuitry included in the evaluating unit and will prevent a distortion of the result of measurement by pieces of wood or bark which contact the chain conveyor or by protruding parts of the treetrunk. The diameter will always be calculated only in dependence on the number of adjacent shielded receiving elements of the two receiving beams.

BRIEF DESCRIPTION OF THE DRAWING

FIG. 1 is an elevation showing an apparatus which embodies the invention.

FIG. 2 is a sectional view taken on line E—E in FIG. 1.

DETAILED DESCRIPTION OF THE PREFERRED EMBODIMENT

Figure 3:
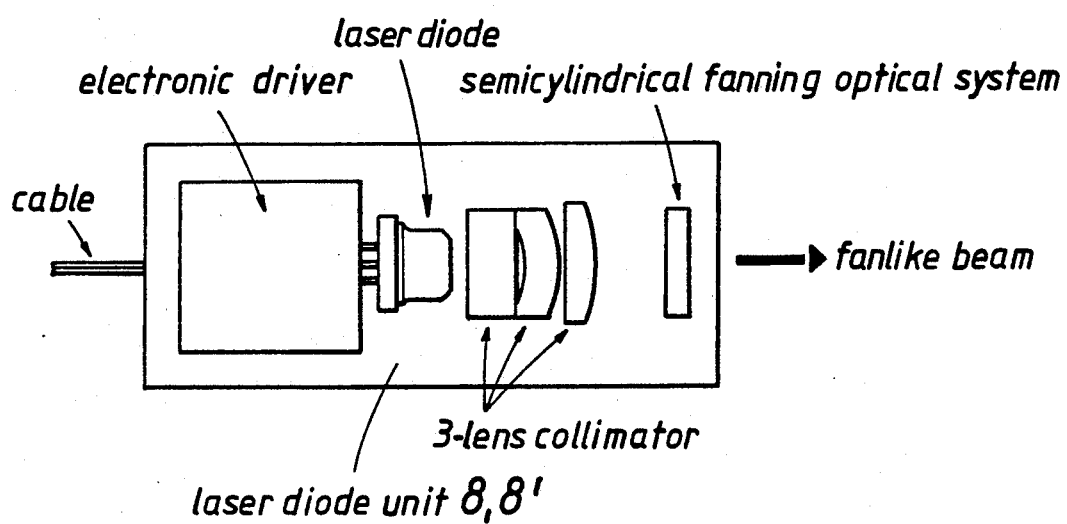
FIG. 3 is a circuit diagram showing a light transmitting element comprising a laser diode, a three-lens collimator and a fanning optical means for emitting a fan-like light beam.

An illustrative embodiment of the invention will now be explained in more detail with reference to the drawing.

FIG. 1 diagrammatically shows a chain conveyor 2, in which a treetrunk 1 is transported in the direction indicated by the arrow B in FIG. 2. The chain conveyor 2 is split adjacent to the measuring plane 7 (FIG. 2) and the measuring portal 10 so that the measuring operations will not be affected by the conveyor. Instead of a split chain conveyor, a chain conveyor may be used, which has a chain guide that is provided with a deflecting roller or formed with a gap, which ensures that the measuring apparatus will not be influenced by the conveyor.

To determine the diameters or the volume of the treetrunk 1 a measuring portal 10 is provided, through which the treetrunk 1 is moved and which consists of columns 11, 11' and support beams 4 and 4' for light receiving elements 6 and 6' of the measuring system. The columns 11, 11' and support beams 4, 4' consist of sectional metal bars and are firmly joined to each other. The support beams 4 and 4' are symmetrically arranged and enclose an angle of 90° with each other. Alternatively, more than two support beams may be provided, for instance, three support beams, adjacent ones of which enclose an angle of 120° with each other. The measuring gate 10 extends at right angles to its supporting surface and is stably anchored. A beam 5 or 5' for light receiving elements 6 and 6' is mounted on each of the support beams 4 and 4' on its side face which faces the measuring plane 7. The beams 5 and 5' consist of watertight housings formed each with a glass-covered longitudinal slot 50 or 50' extending in the measuring plane 7.

Figure 4:
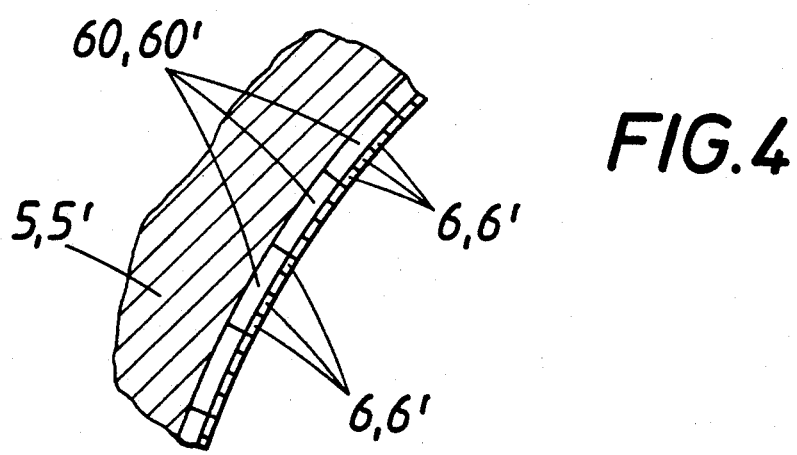
FIG. 4 is an enlarged fragmentary sectional view of a support beam with a plurality of groups of light transmitting elements.

In the interior of each of the housings 5 and 5' a plurality of phototransistors 6 or 6', which are spaced uniformly about 3 mm apart, are arranged in a row extending approximately along an arc of a circle. In the embodiment illustrated in FIG. 4, phototransistors 6 or 6' of each row are arranged in identical groups 60 or 60', each of which is constituted by a printed circuit board provided with 64 phototransistors 6 or 6'.

A laser diode unit 8, 8' is disposed at the center of each the arcuate rows of phototransistors 6 and 6' at a fixed distance A from the associated support beam 4 or 4'.

Each of said laser diode units 8 and 8' is accommodated in a tight housing, which is formed with a glass-covered slot 80, 80' on the side which faces the associated longitudinal slot 50, 50' of the associated beam 5 and 5'. The housing is mounted between two rectangular plates 18, 19 or 18', 19', which laterally protrude from the housing and are fixedly connected to respective columns 11 and 11' of the measuring portal 10. The plates 18, 19; 18', 19' are provided with a black coating on that surface which faces the housing so that reflections of the laser beam will be avoided.

An infrared light detector 9, 9' is mounted on protruding cantilever arms 12 and 12' of the measuring portal. The measuring operations are initiated by the treetrunk 1 as it passes through that infrared light detector 9, 9'. The length of the treetrunk 1 can exactly be calculated from the time for which the beam of the infrared light detector 9, 9' is interrupted and the velocity of the treetrunk chain conveyor 2, 2'. The velocity of the chain conveyor 2, 2' can be monitored or detected in conventional manner by a pulse generator coupled to the chain conveyor.

The evaluating unit 20 is electrically connected to the two rows of phototransistors 6 and 6', the two laser diode units 8, 8' and infrared light detector 9, 9', as is diagrammatically indicated in FIG. 1.

A liquid crystal display 21 for a digital indication of the size parameters is also connected to the evaluating unit 20. A serial interface 22 is connected to means for the further processing and recording of the measured values.

FIG. 2 illustrates the condition which is assumed by the apparatus when the treetrunk 1 is moving through the measuring portal 10 and through the measuring plane and the forward end portion of the treetrunk is just over the gap between the two sections of the split chain conveyor 2, 2'. The measuring operations had been initiated in the evaluating unit 20 as soon as the treetrunk 1 began to interrupt the light beam of the light detector 9, 9'.

After that initiation and a present delay for the time required for the movement of the treetrunk 1 to the measuring plane 7, the first measuring operation is performed. The evaluating unit 20 consists of a microprocessor system including a memory unit and activates the laser diode units 8 and 8' at a clock frequency of at least 300 Hz. The phototransistors of the receiving beams 5 and 5' had already been activated as the apparatus and the chain conveyor 2, 2' had been turned on.

Fanlike laser flashes in the visible red wavelength range of about 670 nm or in the infrared range of about 950 nm are emitted in synchronism by the two laser diode units 8 and 8' at the above-mentioned clock frequency. Said laser flashes will propagate in the measuring plane 7 and will be incident as a line of light on each row of phototransistors 6 and 6' with the exception of those of the phototransistors 6 and 6' which are shielded by the treetrunk 1. The fanlight laser beam is formed by a three-lens collimator, by which the light emitted by the laser diode is focused and converted to parallel beams, which are finally transformed to a fanlike beam by the semicylindrical faming optical systems. The laser diode units 8 and 8' may consist of semiconductor lasers having an output power of about 3 mW or of He-Ne lasers provided with a rotating prism for generating laser light flashes. In the phototransistors in the housings 5 and 5' the lines of incident light result in a generation of relatively strong electric signals, which need not be amplified before they are processed further in bistable multivibrators (flip-flops). Each photo-transistor is connected to a bistable multivibrator by means of a filter circuit, which consists of a capacitor and a resistor, so that extraneous constant light will be suppressed and only the incident laser light flashes will be stored in the bistable multivibrators.

In the evaluating unit 20 the stored signals are counted and their number is substrated from the known total number of phototransistors of each receiving beam 5 or 5'. Logical circuitry is employed to simulate an illumination of phototransistors which are shielded by protruding parts of the treetrunk 1.

The optoelectronic measuring apparatus has a geometry which provides for fixed distances between each row of phototransistors 6 and 6' and the associated laser diode unit 8 or 8' and fixed distances between the two laser diode unit 8 and 8' and for a right angle between the two beams 5, 5'. Owing to that geometry the diameter of the treetrunk 1 and the distance to the center of the treetrunk 1 can be calculated if the length of the arcuate rows of photo-transistors 6 and 6' and the positions and number of the shielded phototransistors are known.

For instance, if the center of the treetrunk 1 and the two laser diode units are considered to be at the corners of a triangle, the distances from the two laser diode units 8, 8' to the center of the treetrunk can be calculated by known formula employing the law of sines.

It will be understood that known formulas may also be employed to calculate the angles which are included by the diameters of the treetrunk 1 and to calculate said diameters in dependence on the position of the treetrunk 1 and this can be accomplished without a need for detailed explanations at this juncture.

The evaluating unit 20 is programmed for an algorithm which corresponds to the required formulas and which can be employed to exactly calculate the diameter of the treetrunk 1, optionally also with a temperature compensation.

Red and green light-emitting diodes may be provided at readily visible locations on the measuring portal 10 and/or on the evaluating unit 20 and may be used to indicate a failure of the clock pulses and the energization of the transmitting elements.

Each measuring operation may be controlled by the evaluating unit 20 in such a manner that a center diameter of the treetrunk 1 can be arithmetically determined.

The evaluating unit 20 may comprise an interface 22 for connection to a recorder and/or to a display screen and printer. In that case the several diameters, the center diameters, the length and the identification number of the treetrunk 1 can be displayed and printed out.

The evaluating unit 20 may be arranged for connection to means for indicating a defect caused by a soiling of the optoelectronic measuring apparatus, signals indicating the determination of parameters exceeding the measuring range, a failure of the chain conveyor 2,2', or to higher-level computers.

Because the beams 5 and 5', the laser diode units 8 and 8', and the photodetector 9, 9' are fixed to the stable measuring portal, the apparatus for measuring the diameter and/or the volume of a treetrunk 1 is highly stable and reliable. The accuracy of the measurement will substantially depend on the number of phototransistors 6 and 6' in each of the beams 5 and 5'. In the embodiment described by way of example each of the beams 5 and 5' comprises 512 phototransistors 6 or 6' and that number may easily be doubled if alternate phototransistors 6 or 6' are offset in each row.

We claim:

1. An apparatus for determining at least one size parameter of an object having a longitudinal axis extending in a predetermined direction, whether said object is at rest or moving in said predetermined direction, which apparatus comprises
   (a) a measuring portal defining a measuring plane extending substantially perpendicularly to said predetermined direction, which portal comprises at least two support beams for light receiving means, the support beams enclosing a predetermined angle with each other,
      (1) each support beam having a side face facing the measuring plane,
      (2) the light receiving means comprising a plurality of light receiving elements arranged in at least one row on said side face of each support beam and extending therealong,
   (b) an optoelectronic measuring system comprising light transmitting means and said light receiving means optically communicating with said light transmitting means, the light transmitting and receiving means being disposed in said measuring plane,
      (1) the light transmitting means comprising a single light transmitting element associated with each row of the light receiving elements and spaced in the measuring plane a predetermined distance from the support beam whereon the light receiving elements are arranged, each light transmitting element being operable to emit a fan-like light beam incident on the light receiving elements of the associated row, and the measuring system comprising (2) an evaluating unit responsive to said light receiving means, and (c) activating means for periodically activating said light transmitting elements to emit said fan-like light beams.

2. The apparatus set forth in claim 1, wherein
each of said rows of said receiving elements extends substantially along an arc of a circle and
each of said transmitting elements is disposed at the center of one of said arcs.

3. The apparatus set forth in claim 1, wherein each of said transmitting elements consists of a laser diode unit comprising a laser diode, a three-lens collimator, fanning optical means for emitting said fanlike light beam, and a multiflexible electronic driver.

4. The apparatus set forth in claim 1, wherein
each of said receiving elements consists of a phototransistor,
each of said rows of receiving elements is accommodated in a watertight housing mounted on said side face of one of said support beams and on the side which is opposite to said one side face is formed with a slot, which is glass-covered on the outside, and
each of said transmitting elements is operable to emit a fanlike light beam through said slot onto the associated row of receiving elements.

5. The apparatus set forth in claim 1, wherein
the receiving elements of each of said rows are divided into a plurality of identical groups mounted on respective identical printed circuit boards.

6. The apparatus set forth in claim 1, wherein
each of said transmitting elements is accommodated in a watertight housing formed with a slot that faces the associated support beam and is glass-covered on the outside,
said measuring portal comprises two laterally spaced apart columns,
a rectangular plate is secured to each of said columns and
each of said housings extents between and is secured to both of said rectangular plates, which laterally protrude from said housing.

7. The apparatus set forth in claim 1, wherein said activating means are selectively operable to activate said transmitting elements for an emission of a continuous emission of light beams.

8. The apparatus set forth in claim 1, wherein said activating means are operable to periodically and synchronously activate said transmitting and receiving elements at a clock frequency in excess of 300 Hz.

9. The apparatus set forth in claim 1, wherein
said apparatus is adapted to determine at least one of the size parameters consisting of the diameter and volume of an object when it is disposed to shield a number of the receiving elements of each of said rows from said light beams from the associated one of said transmitting elements,
said rows of receiving elements have constant lengths,
each of said transmitting elements is spaced a constant first distance from the associated row of receiving elements,
said transmitting elements are spaced a constant second distance apart, and
said evaluating means comprise means for determining on each of said rows of receiving elements the number of said receiving elements which are shielded from the associated transmitting element, means for determining and indicating at least one of the parameters consisting of the diameter and volume of said object in dependence on said numbers of shielded receiving elements, the constant lengths of the two rows of receiving elements, and said first and second distances, and
means for generating a position signal depending on the distance from said object to said transmitting elements.

10. The apparatus set forth in claim 1, as applied to an apparatus which is adapted to determine at least one size parameter of an object which has a body adapted to shield part of said receiving elements in each of said rows thereof from the associated transmitting elements and projecting portions adapted to shield additional receiving elements of each of said rows thereof from the associated transmitting elements, wherein
said evaluating unit is arranged to simulate an illumination of said additional receiving elements of each row thereof when they are shielded by such protruding portions.

* * * * *